United States Patent [19]
Flentge

[11] Patent Number: 5,598,378
[45] Date of Patent: Jan. 28, 1997

[54] METHOD OF PERFORMING HIGH RESOLUTION CROSSED-ARRAY SEISMIC SURVEYS

[75] Inventor: David M. Flentge, Houston, Tex.

[73] Assignee: Western Atlas International, Inc., Houston, Tex.

[21] Appl. No.: 339,489

[22] Filed: Nov. 14, 1994

Related U.S. Application Data

[63] Continuation-in-part of Ser. No. 71,515, Jun. 3, 1993, Pat. No. 5,511,039.

[51] Int. Cl.[6] .............................. G01V 1/20; G01V 1/36
[52] U.S. Cl. .............................................. 367/56; 367/58
[58] Field of Search ............................................ 367/56, 58

[56] References Cited

U.S. PATENT DOCUMENTS

| | | | |
|---|---|---|---|
| 2,329,721 | 9/1943 | Hoover et al. | 367/58 |
| 3,793,620 | 2/1974 | Miller | 367/56 |
| 4,476,552 | 10/1984 | Waters et al. | 367/58 |
| 4,597,066 | 6/1986 | Frasier | 367/50 |
| 4,677,598 | 6/1987 | Johnson | 367/56 |
| 4,742,497 | 5/1988 | Beasley et al. | 367/52 |
| 4,933,912 | 6/1990 | Gallagher | 367/56 |
| 5,029,145 | 7/1991 | Marsden et al. | 367/56 |
| 5,257,241 | 10/1993 | Henderson et al. | 367/15 |
| 5,402,391 | 3/1995 | Cordsen | 367/56 |

OTHER PUBLICATIONS

Ritchie, W; 61st Annv. Seg Mtg., Nov. 10, 1991, V-1, pp. 750–753; abst. only herewith.

Buchholtz, H.; Circum–Pacific Counc. Energy Mineral Resources; China, Sep. 20, 1984, vol. 10, pp. 737–752 abst. only herewith.

*Primary Examiner*—Nelson Moskowitz
*Attorney, Agent, or Firm*—Charles R. Schweppe

[57] ABSTRACT

This invention provides a method for performing three dimensional seismic surveys. In one configuration, receiver lines containing equally spaced receiver stations run in one direction while the source station lines run orthogonal to the receiver station lines. The receiver stations and/or the source stations are offset to obtain a desired spatial sampling (number of bins) or multiplicity of the common mid points. In an alternate configuration, the receiver line spacing is offset by a fraction of the source station spacing and/or the source line spacing is offset by a fraction of the receiver station spacing to obtain the desired spatial sampling. These configurations provide higher spatial sampling (smaller bins) compared to the conventional geometries. The smaller bins may be combined to obtain folds (multiplicity) which is sufficient to provide desired seismic imaging while preserving the benefits provided by the higher spatial sampling by the method of the present invention. Improved offset distribution is obtained by placing the source lines non-orthogonal to the receiver lines.

3 Claims, 6 Drawing Sheets

METHOD OF PERFORMING HIGH RESOLUTION CROSSED-ARRAY SEISMIC SURVEYS

CROSS-REFERENCE TO RELATED APPLICATION

This application is a continuation-in-part to U.S. patent application Ser. No. 08/071,515, filed on Jun. 3, 1993, now U.S. Pat. No. 5,511,039.

BACKGROUND OF THE INVENTION

1. Field of the Invention

This invention relates generally to seismic prospecting, and more particularly to a method of performing three dimensional seismic surveys on land utilizing staggered crossed-array survey geometries.

2. Description of Related Art

In seismic exploration, to obtain information relating to the substrata located below the earth's surface, seismic waves in the form of pressure pulses or shock waves are induced into the earth. These shock waves propagate through the substrata beneath the earth's surface where they are reflected by the subterranean interfaces back to the earth's surface. The reflected seismic waves are detected by a plurality of spaced apart receivers placed on the earth's surface, which convert the reflected seismic waves into signals. A geophone or a group of geophones is typically used as a receiver. The (stratigraphical information) of the substrata. Seismic sources, such as seismic vibrators and/or explosive devices, are used to produce the shock waves.

In recent years, three dimensional ("3D") seismic surveys have become very common for they provide more comprehensive geophysical information about the earth's subsurface compared to the conventional two dimensional ("2D") surveys. However, 3D surveys require the use of complex survey geometries and they produce significantly more seismic data compared to the two dimensional surveys. Three dimensional surveys are typically performed using what is called a "swath method." In a swath method, a plurality of very long (3000–6000 meters) receiver lines, each containing a plurality of uniformly spaced apart receivers (receiver stations), are placed in parallel on the earth's surface (terrain) which is to be surveyed. Each receiver defines a single receiver point on the receiver line. The data gathering equipment limitations and other economic considerations frequently dictate the number of receiver lines, number of receivers on each receiver line and the receiver spacing that can be used to perform a survey.

After placing the receiver lines on the earth's surface, a seismic source such as a seismic vibrator or an explosive device is activated at predetermined spaced-apart locations ("source stations" or "source points") to impart desired shock waves into the earth. The source stations are placed along source lines which run orthogonal to the receiver lines and midway between adjacent receivers.

Figure 1:
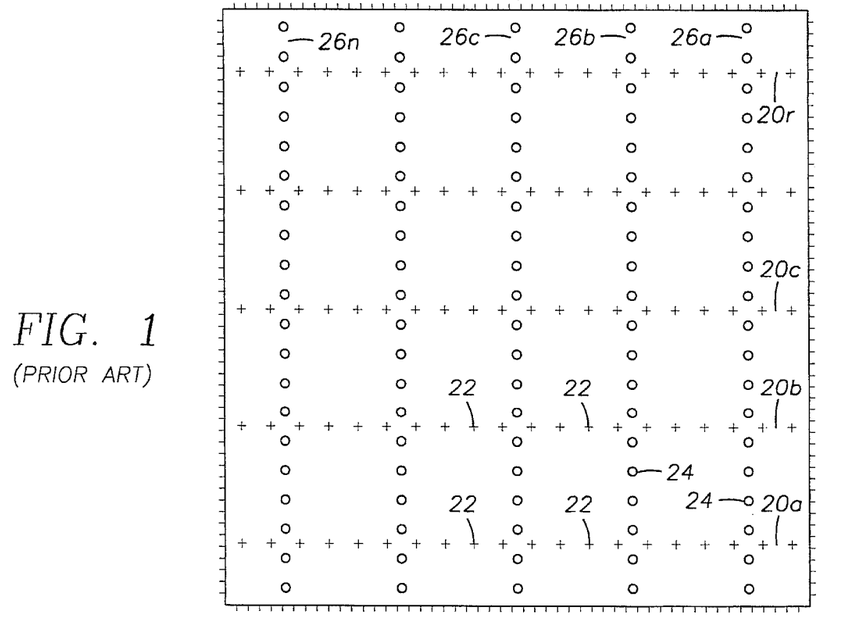
FIG. 1 shows a prior art seismic survey geometry of receivers and source points.

A typical prior art three-dimensional survey geometry is shown in FIG. 1. A plurality of receiver lines 20a, 20b . . . 20r, each containing a plurality of equally spaced apart receivers 22 are placed in parallel on the earth's surface. A seismic source is activated at predetermined source stations 24, placed along source lines or shot lines 26a, 26b . . . 26n, which run orthogonal to the receiver lines 20a–20r. The source lines lie at the middle of predetermined adjacent receivers. This provides a symmetrical crossed-array geometry wherein shot lines 26a–26n are orthogonal to the receiver lines 20a–20r. The resultant seismic traces (seismic data) are recorded corresponding to the common-midpoints ("CMP") between the source points and the receivers. A common-midpoint being the same midpoint for seismic traces obtained from different combinations of source points and the receivers in a seismic survey geometry. Common-midpoints are also referred to in the art as common-depth-points or common-reflection-points. Once the source has been activated at each of the predetermined source points and the resultant data has been recorded, the swath is moved to an adjacent terrain and the above-noted process is repeated.

Figure 1A:
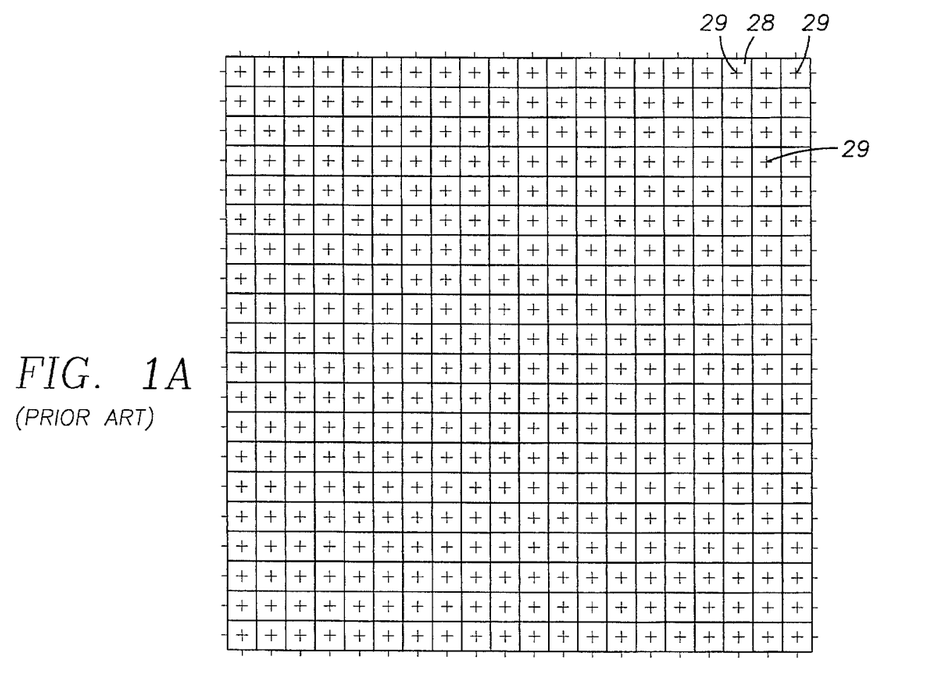
FIG. 1A shows the common-midpoint bin sizes which result when the survey geometry of FIG. 1 is used.

In the prior art seismic survey geometries, the receivers on all the receiver lines are equidistant and all lines are symmetrically placed, i.e., the receivers are in a rectangular array. There is no stagger between the receivers in two adjacent receiver lines. The source lines are likewise symmetrical and are placed midway between adjacent receivers, as shown in FIG. 1. Such a survey geometry provides seismic data for common-midpoints, which correspond to cells or bins having the dimensions of one-half (½) the spacing between adjacent receivers on the receiver lines and one-half (½) the spacing between adjacent source points along the source lines. For example, if the receivers and the source points are each fifty (50) meters apart, each bin will be twenty-five by twenty-five (25×25) meters. Each such bin will contain seismic data corresponding to one common-midpoint. The resultant bins obtained from the survey geometry of FIG. 1 are shown in FIG. 1A. Each solid lined square 28 indicates the bin size and the center 29 of each such bin represents the common-midpoint associated with that bin.

During surveying operation, each source point produces seismic traces for each midpoint in the survey geometry. As the source is moved, the midpoints overlap. The data for each midpoint is collected for all shots and the data common to a midpoint is added or stacked to obtain better definition of the data for each common-midpoint. The spacing between the receivers and the shot points, or the bin size defines the spatial resolution of a survey geometry. The spatial resolution of such prior art survey geometries may be improved by reducing the bin size, i.e., by decreasing the receiver and/or shot point spacings, which increases the equipment cost, operational time to perform the survey and the data processing time. Also, in the prior art methods, the bins are sufficiently large and may not be appropriately combined ("macrobinned"), for example, when data from certain CMP's is either not recorded due to physical configuration difficulties or equipment failure.

It is therefore highly desirable to have a method of geophysical prospecting which provides small data bins (higher spatial resolution) compared to the prior art bins ("standard" cells or bins) without substantially increasing the cost of the equipment or requiring additional operational time while allowing one to preserve the benefits of the standard cells.

The quality of the results, i.e., seismic maps, obtained from the processing of seismic data using processing techniques, such as stacking, normal-moveout correction, dip-moveout correction and migration, depends partially on the bin size. When a smaller bin size is desired, the prior art survey would need to be performed using a narrower grid (smaller receiver and/or source spacing), which is sometimes not possible due to the nature of the terrain or is cost prohibitive. On the other hand, it is highly desirable to perform seismic surveys having wider spaced grids but which provide spatial resolution equivalent to a narrower grid. Furthermore, it is highly desirable to have a method for performing seismic surveys which, for given equipment, provides flexibility with the bin size without compromising spatial resolution and without increasing the operational cost.

As noted earlier, to improve the quality of data, seismic traces for common-midpoints are collected. Such traces result from reflections from the common-midpoints from several combinations of source points and the receivers in the survey geometry. There is associated an "offset" with each such trace. For the purpose of this invention, the term "offset" is defined as the surface distance between a source point and a receiver. It is known in the art that "offset distribution" relating to common-midpoints is an important parameter in any 3D survey. The ideal offset distribution is completely uniform or linear. Two dimensional surveys, due to their simple survey geometries, provide linear offset distribution. However, due to the complexity of 3-D geometries, the offset distribution is nonuniform or nonlinear.

Figure 5:
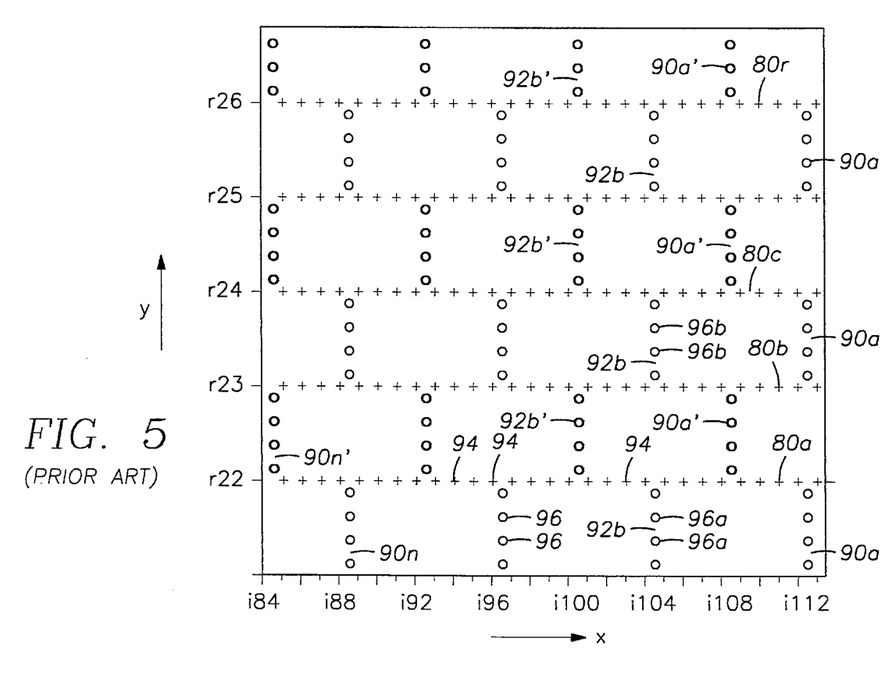
FIG. 5 shows a "stairstep" or "bricklayer" survey geometry.

To obtain a more uniform offset distribution, survey geometries referred to as the "stairstep" or "bricklayer" survey geometries have been used. FIG. 5 shows a commonly used stairstep geometry. Such a survey geometry improves the offset distribution, but does not provide fractional binning. Additionally, such a geometry is difficult to use in the field and costs more to perform the survey. The use of such a survey geometry is described later.

The present invention provides methods for performing seismic surveys which address the above-noted problems. The methods of the present invention provide smaller or fractional bins compared to the bins obtained using conventional methods, flexibility of manipulating bin sizes, improved offset distribution compared to the conventional methods and allows the use of differently spaced receiver and source lines for performing seismic surveys.

SUMMARY OF THE INVENTION

This invention provides a method of performing high resolution crossed-array seismic survey. A plurality of receiver lines, each having equally spaced receiver stations, are placed equidistant from and parallel to each other. Seismic shock waves or energy pulses are generated at predetermined spaced-apart source points along equally spaced source lines. In one configuration, the receiver lines and the source lines are orthogonal to each other and the receiver stations in adjacent receiver lines are staggered by a fraction of the receiver spacing or the source stations in adjacent source lines are staggered by a fraction of the source station spacing or both the receivers and the source stations are staggered to obtain a desired number of fractional bins (spatial sampling).

A seismic source is energized at the source points to induce seismic pulses into the earth and the reflected seismic pulses from the substrata are detected by the receivers. The receivers provide signals representative of seismic pulses reflected from the earth's subsurface, which are then recorded and processed to obtain geophysical information. Thus, this configuration contains a crossed-array seismic survey geometry, wherein the receiver stations in adjacent receiver lines and/or the source stations in adjacent source lines are staggered. Such a survey method provides higher spatial sampling (smaller bins) compared to the crossed-array survey geometries wherein the receivers or source point are not staggered.

In an alternate method, no stagger between the receivers or the source points is provided, but smaller bins are obtained by adjusting either the receiver line spacing or the source line spacing or both. The receiver line spacing is made equal to an integer and a fraction times the source station spacing and/or the source line spacing is made an integer and a fraction times the receiver station spacing. This configuration also provides fractional bins and thus higher spatial sampling (smaller bins) compared to the conventional geometries.

Yet in an another method, the receiver and/or the source locations are staggered and the source lines are placed at a predetermined angle other than ninety degrees (orthogonal) to the receiver lines. Such survey geometries provide fractional bins and also provide more uniform offset distribution compared to the survey geometries described hereinabove and the conventional survey geometries, such as the survey geometry shown in FIG. 1.

The smaller bins may be combined to obtain folds (multiplicity) which are sufficient to provide desired seismic imaging while preserving the benefits provided by the higher spatial sampling of the method of the present invention.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following description of the preferred embodiment, taken in conjunction with the accompanying drawings, in which like elements have been given like numerals and wherein.

DETAILED DESCRIPTION OF THE PREFERRED EMBODIMENTS

As noted earlier, FIG. 1 shows a typical prior art (conventional) seismic survey geometry of receivers and shot points. FIG. 1A shows the bin sizes for common-midpoints that result from the seismic survey geometry of FIG. 1.

In the present invention, smaller bin sizes compared to the bin sizes of the conventional seismic survey geometries (utilizing the same receiver station spacing and the same source station spacing) are obtained by staggering the receiver stations in adjacent receiver lines and/or by staggering source stations (source points) in adjacent source lines, or by adjusting the receiver line spacing relative to the source station spacings and/or by adjusting the source line spacing relative to the receiver station spacings.

Improved offset distribution is obtained by placing the source lines non-perpendicular to the receiver lines while keeping the orthogonal distance between the receiver lines and the source points to be the same as in the above-described staggered survey geometries.

It is considered helpful to explain the survey geometries of the present invention by way of specific examples. It will, however, be understood that the survey geometries described herein are used to aid the reader in understanding the present invention and not as limitations to the present invention.

Figure 2:
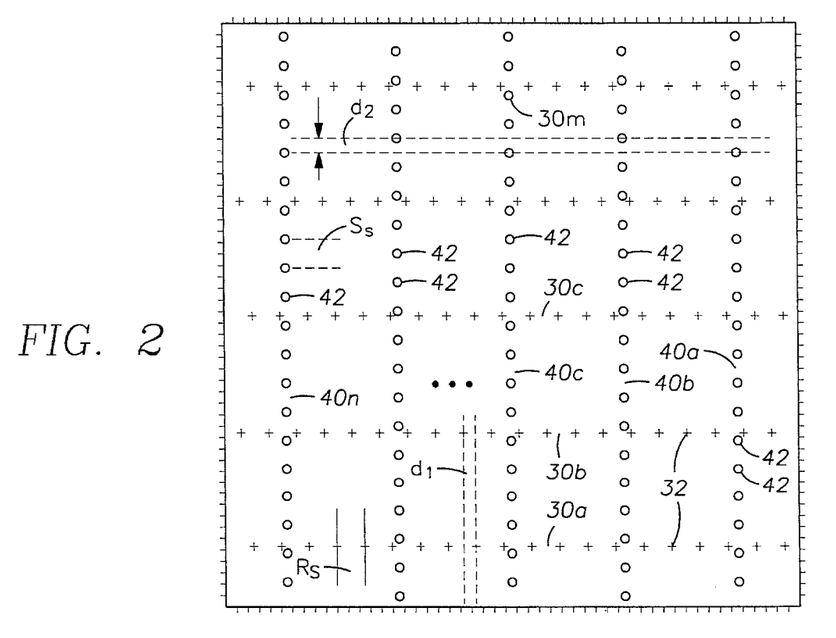
FIG. 2 shows a seismic survey geometry of receivers and source points according to the present invention.

FIG. 2 shows an example of a survey geometry according to the present invention, wherein both the receiver stations and the source points are staggered to provide smaller bins compared to a standard bin. In FIG. 2, a plurality of receiver lines 30a, 30b . . . 30m are placed in parallel on the terrain to be surveyed. Each such receiver line has a plurality of spaced apart receivers 32. The spacing Rs between adjacent receivers on the receiver lines is the same. However, the receivers in adjacent receiver lines are staggered by a predetermined distance $d_1 = 1/j$ (Rs), where j is an integer greater than or equal to two (2). For simplicity and convenience, FIG. 2 is shown with j=2, i.e., the receiver stagger is one-half (½) the receiver spacing. Staggering the receivers in this manner produces multiple common-midpoints along the x-axis, such as shown by 45 in FIG. 2A. In general, staggering the receivers by 1/j the receiver spacing provides j common-midpoints along the x-axis for each standard bin. Thus, in FIG. 2, staggering the receiver in adjacent receiver lines by one-half (½) the receiver spacing provides two (2) common-midpoints for each standard bin. Similarly, staggering receivers by one-third, the receiver spacing will provide three common-midpoints along the x-axis.

A plurality of equally spaced apart parallel source lines 40a, 40b . . . 40n are defined along the terrain. Each such source line contains a plurality of source stations 42. The spacing Ss between adjacent source stations along the source lines is the same. However, the source stations are staggered by a distance $d_2 = 1/k$ (Ss), where k is an integer greater than or equal to two (2). For simplicity and convenience, the source station stagger in FIG. 2 is shown to be one-half (½) the distance between adjacent source stations along the source lines. Staggering the source stations produces multiple common-midpoints along the y-axis, such as shown by 46, in FIG. 2A. In general, staggering the source stations by 1/k the source station spacing Ss provides k common-midpoints along the y-axis. Thus, in FIG. 2, staggering the source station by one-half (½) the source station spacing provides two (2) common-midpoints. Similarly, staggering source stations by one-third the source station spacing will provide three common-midpoints. From the above explanation, it should be obvious that staggering the receivers by 1/j the receiver spacing and staggering the source stations by 1/k the source station spacing provides j×k common-midpoints for each standard cell.

Figure 2A:
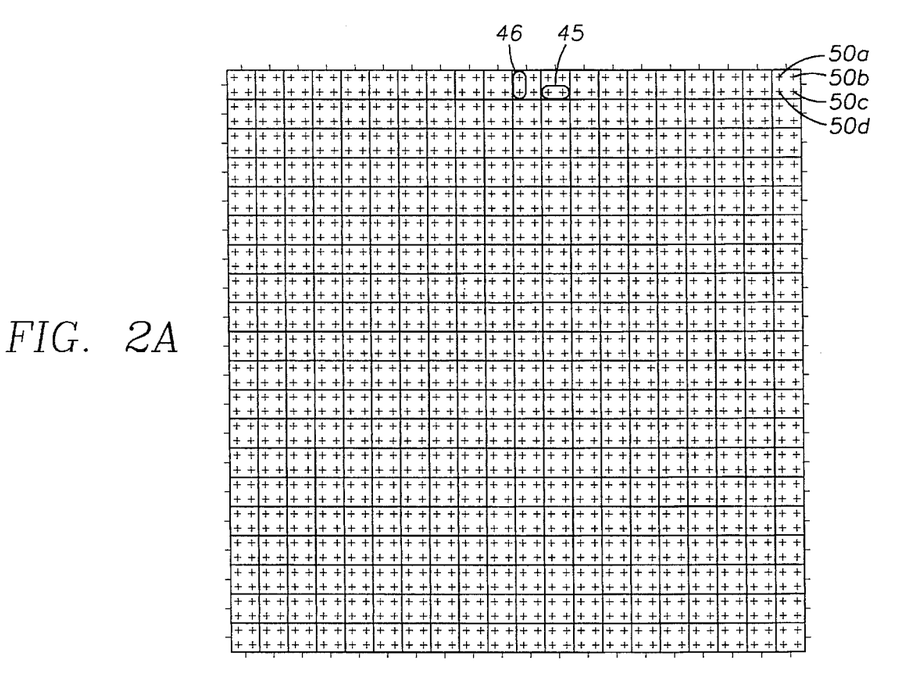
FIG. 2A shows the common-midpoint bin sizes which result when the survey geometry of FIG. 2 is used.

FIG. 2A shows the common-midpoints corresponding to the seismic survey geometry of FIG. 2. Such a survey geometry provides four (j×k=4) common-midpoints for each standard cell. In FIG. 2A, the bins corresponding to the cells of FIG. 1 are outlined in solid boxes. Each such standard bin contains four midpoints 50a, 50b, 50c and 50d. The survey geometry of FIG. 2A results in the same trace sampling density as that of the survey geometry of FIG. 1, yet provides improved spatial sampling in each direction by a factor of two (2). Thus, using the seismic survey geometry of FIG. 2 allows binning the fold of a prior art cell into four (4) evenly spaced "quarter cells" or "quarter bins" sometimes referred to herein as "microbins", each microbin having dimensions of ½ standard bin×½ standard bin. It should be obvious that the time which it will take to perform a seismic survey using the survey geometry of FIG. 1 or FIG. 2 will substantially be the same. It should be noted that multiple common-midpoints for each standard bin may be obtained by staggering the receivers alone or by staggering the source stations alone.

The receiver line spacing, number of receiver lines, number of receivers in each line and the shot point spacing generally depend upon the equipment used to collect seismic data, terrain configuration, depth of target or multiple targets and other technical and economic considerations. To perform a survey using the survey geometry of FIG. 2, the receiver lines are first placed as desired according to the method noted above. A source such as a seismic vibrator or an explosive device is then placed at the predetermined source stations 42 and activated. The source generates seismic pulses which are induced into the earth and are reflected by the substrata layers back to the earth's surface. The reflected waves are detected by the receivers 32. The receivers 32 convert the received seismic waves into electrical signals, which are transmitted to recording and processing equipment (not shown).

After all the data has been recorded corresponding to a source point, the source is moved to the next source point along the source line. When the source is activated, each receiver provides data corresponding to the midpoint between the source and the receiver, thereby providing data for a row of common-midpoints for each receiver line. When the source is moved to the next source point, the receivers provide data for some new common-midpoints and for some of the previously recorded common-midpoints, thereby providing overlapping data. The data belonging to the same common-midpoint is combined by known methods in the art of seismic prospecting to obtain the seismic trace corresponding to each common-midpoint. The source is then moved to the next source point and the above process is repeated until the entire terrain has been surveyed.

Figure 3:
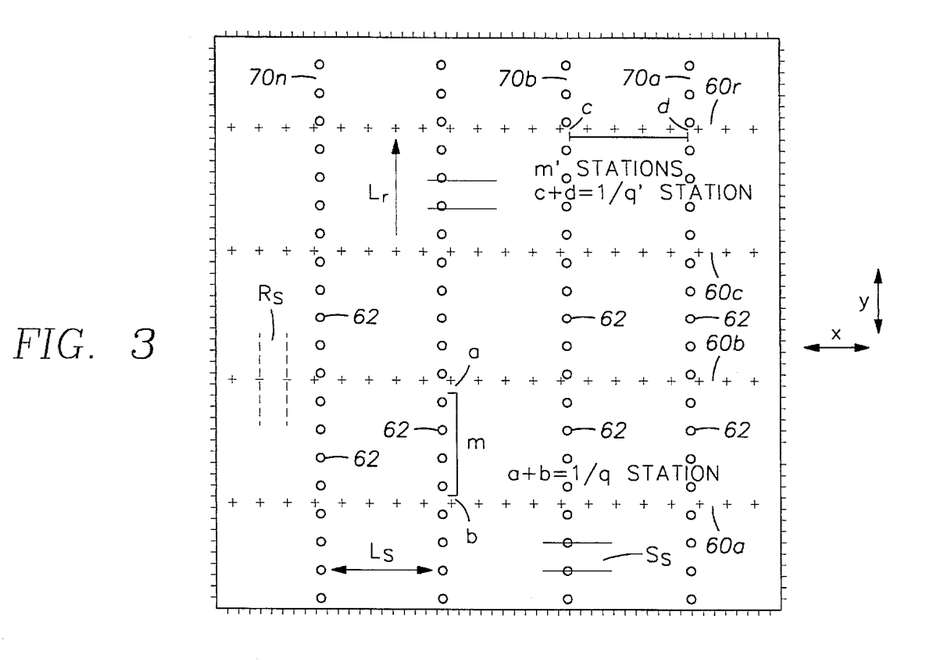
FIG. 3 shows an alternate seismic survey geometry of receivers and source points according to the present invention.

FIG. 3 shows another example of the seismic survey geometry according to the present invention. In this configuration, a plurality of receiver lines 60a–60r, each receiver line containing a plurality of equally spaced (Rs) receiver stations, are placed in parallel. The receiver stations in adjacent receiver lines are aligned, as in the prior art FIG. 1. The source lines 70a–70n are shown orthogonal to the receiver lines. The spacing Ss between adjacent source stations is the same. The source stations 62 are aligned in the receiver line direction. The spacing Lr between adjacent receiver lines is a function of the source station spacing Ss and may be expressed as $Lr = (m + 1/q) Ss$, where m is an integer and q is an integer greater or equal to two (2). The fraction q defines the shift in the receiver line spacing compared to the receiver line spacing shown in FIG. 2, which is evenly divided between the source stations and the receiver lines as shown by "a" and "b" in FIG. 3.

In the exemplary survey geometry of FIG. 3, m=4 and q=2, i.e, the receiver line spacing is 4½ Ss. The number of common-midpoints corresponding to the receiver line spacing equals q along the x-axis. Thus, there are two (2) common-midpoints associated with the receiver line spacing shown in FIG. 3. In order to obtain multiple common-midpoints in the y-axis, the source lines may similarly be spaced. The source line spacing Ls may be expressed as Ls=(m'+1/q') Rs, where m' is an integer, q' is an integer greater than or equal to two (2) and Rs is the receiver spacing. The number of common-midpoints associated with such a source line spacing is q' along the y-axis. In FIG. 3, m'=4 and q'=2. There are two common-midpoints associated with the source line spacing. The total number of common-midpoints associated with the source line spacing and receiver line spacing of FIG. 3 is the product of q and q'. Thus, FIG. 3 provides four (4) common-midpoints for each standard bin. It should be noted that multiple common-midpoints may be obtained by appropriately spacing the receiver lines alone or by spacing the source lines alone.

Figure 3A:
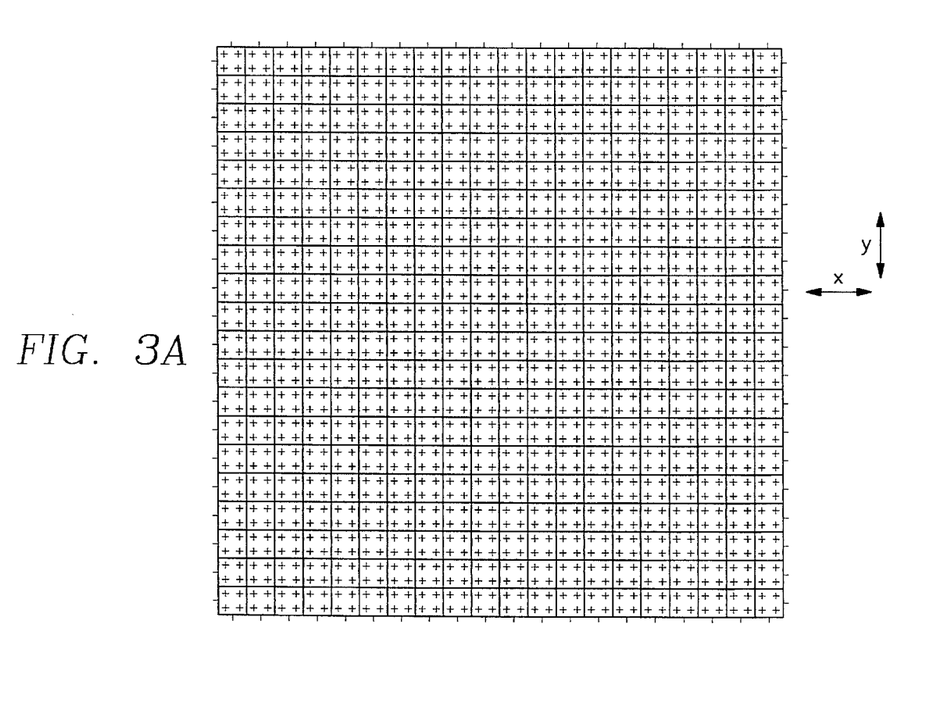
FIG. 3A shows the common-midpoint bin sizes which result when the survey geometry of FIG. 3 is used.

FIG. 3A shows the common-midpoints associated with the seismic survey geometry of FIG. 3. Each standard bin is shown by the solid lines and each such bin contains four common-midpoints. It will be obvious that by choosing different values of q and or q', the microbin size may be altered.

It will also be obvious from the above examples that many combinations of survey geometries may be obtained by staggering the receivers and/or source points, or by appropriately choosing the source line spacing and/or the receiver line spacing. Thus, by manipulating the seismic survey geometry in accordance with this invention, seismic traces for a plurality of common-midpoints for each standard cell may be obtained.

It is known in the art of seismic prospecting that the cell size determines the spatial frequency. Thus, the smaller the cell size, the higher the spatial frequency. It is also known in the art that higher spatial frequency provides higher resolution of the seismic data, which is highly desirable, especially for three dimensional surveys. The quality of the resultant stratigraphical information depends upon the useful information that can be recovered from the data. Nyquist frequency, also called the "folding frequency" associated with the sampling interval (spatial sampling), defines the amount of useful information that can be referred from the data. Nyquist frequency is defined as one half the spatial frequency, i.e., n=½ (spatial sampling). Frequencies greater than the Nyquist frequency alias as lower frequencies (fold into lower frequencies), from which they are indistinguishable. Thus, the information contained beyond the Nyquist frequency is not recovered for data processing purposes and is lost. Thus, smaller cell size (higher spatial sampling frequency) allows recovery of more useful information from the data, thereby improving the resolution of the seismic data.

As discussed above, the exemplary survey geometries of FIGS. 2 and 3 provide cells which are one-half the dimensions of the standard cell. Thus, the Nyquist frequency corresponding to the survey geometries of FIGS. 2 and 3 is twice that associated with FIG. 1, which allows recovery of substantially more information from the data as compared to the standard bin. Also, it is known in the art that smaller common-midpoint multiplicity in the microbins provides lower a signal to noise ratio when the data associated with a common mid point is stacked. However, the number of traces (trace density) is identical in both cases. Macrobinning the same number of traces as in the standard cell allows one to obtain a signal to noise ratio equivalent to that of the standard cell and also allows one to preserve the benefits of higher spatial sampling for input to migration, which is a well known processing technique in the art of seismic data processing. Smaller cells obtained by the method of the present invention allows combining bins (macrobinning) at intervals which are not otherwise available when a survey is performed using standard cell geometry. Such macrobinning further allows one to output seismic traces at microbin spacing when overlapping cells are used to macrobin. This results in improved spatial response, which enhances the quality of information because it prevents high frequency aliasing in migrating steep dip data and further aids in obtaining improved stratigraphic information.

Additionally, macrobinning smaller cells obtained from the method of this invention allows filling in of the offset deficiencies, which improves the normal moveout stack response, which aids in reducing or eliminating coherent noise, such as ground roll and seismic multiples. As noted earlier, to improve the quality of data, seismic traces for common-midpoints are combined to obtain higher resolution. Such traces result from reflections from the common-midpoints from several combinations of source points and receivers in the survey geometry. It is known that "offset distribution" relating to common-midpoints is an important parameter in any 3D survey. The ideal offset distribution is completely uniform or linear. Two dimensional surveys, due to their simple survey geometries provide linear offset distribution. However, due to the complexity of 3-D geometries, the offset distribution is nonuniform or nonlinear.

Figure 4:
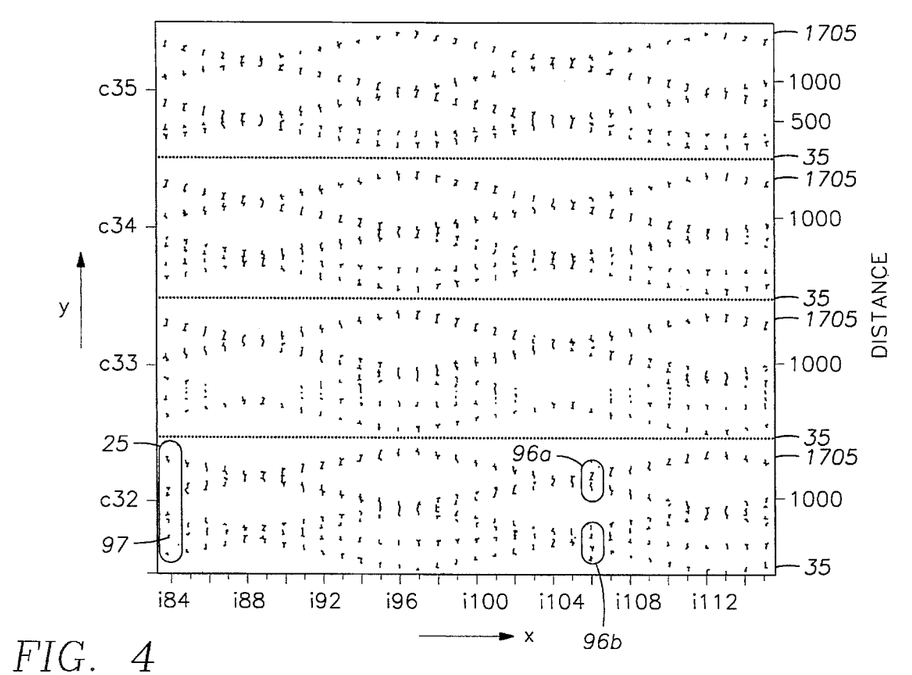
FIG. 4 shows a typical offset distribution corresponding to the survey geometry shown in FIG. 1.

The prior art survey geometries, such as shown in FIG. 1 and the survey geometries of the present invention, such as shown in FIGS. 2 and 3, result in substantially nonuniform offset distributions. FIG. 4 shows a typical offset distribution which results from the survey geometry of FIG. 1. FIG. 4 shows an offset distribution corresponding to a cross-section of in-line cells (numbers i84–i115) shown along the x-axis and cross-line cells (numbers c32–c35) shown along the left hand y-axis. The offset (distance) for each CMP corresponding to an in-line and a cross-line cell combination is specified along the right hand y-axis. The cell numbering and the distances shown in FIG. 4 are provided for illustration purposes only. In the example of FIG. 4, each cell combination is shown to have eight (8) offsets. Each mark, such as mark 97, along the y-axis corresponding to each in-line cell represents one such offset. It will be obvious that a number of offsets in FIG. 4 are not uniformly distributed. For example the offsets 95 relating to cells i84 and c32 are relatively uniformly distributed while the offsets for cells i106 and c32 are clustered in two groups 96a and 96b. Similarly, offset distribution for several other cell combinations is not substantially uniform.

To obtain more uniform offset distribution, "stairstep" or "bricklayer" survey geometries, such as shown in FIG. 5, have been used. To perform a survey using the survey geometry of FIG. 5, a plurality of receiver lines 80a–80r are placed in parallel on the earth's surface. The spacing between adjacent receivers 94 on each receiver line is the same. The receivers in the receiver lines are aligned in the source line direction, i.e., there is no stagger between the receivers in adjacent lines. The source lines are made like stair steps. The source line 90a represents the source line for source points which lie between receiver lines designated as r23 and r24. However, the source line 90a' between the next receiver lines r24 and r25 is shifted a predetermined number of receiver stations. The source line between the next two receiver lines r25 and r26 is in-line with the source line associated with the receiver lines r23 and r24. The source lines between the remaining receiver lines are similarly placed. Thus, in the survey geometry of FIG. 5, the source lines are shifted a predetermined number of receiver stations in adjacent receiver lines. The receiver lines are long and fixed in their make-up and, thus, they can not be staggered. The stairstep survey geometries provide improved offset distribution, but do not provide fractional binning. Additionally, such survey geometries are difficult to use in the field and cost more to perform the survey.

Figure 6:
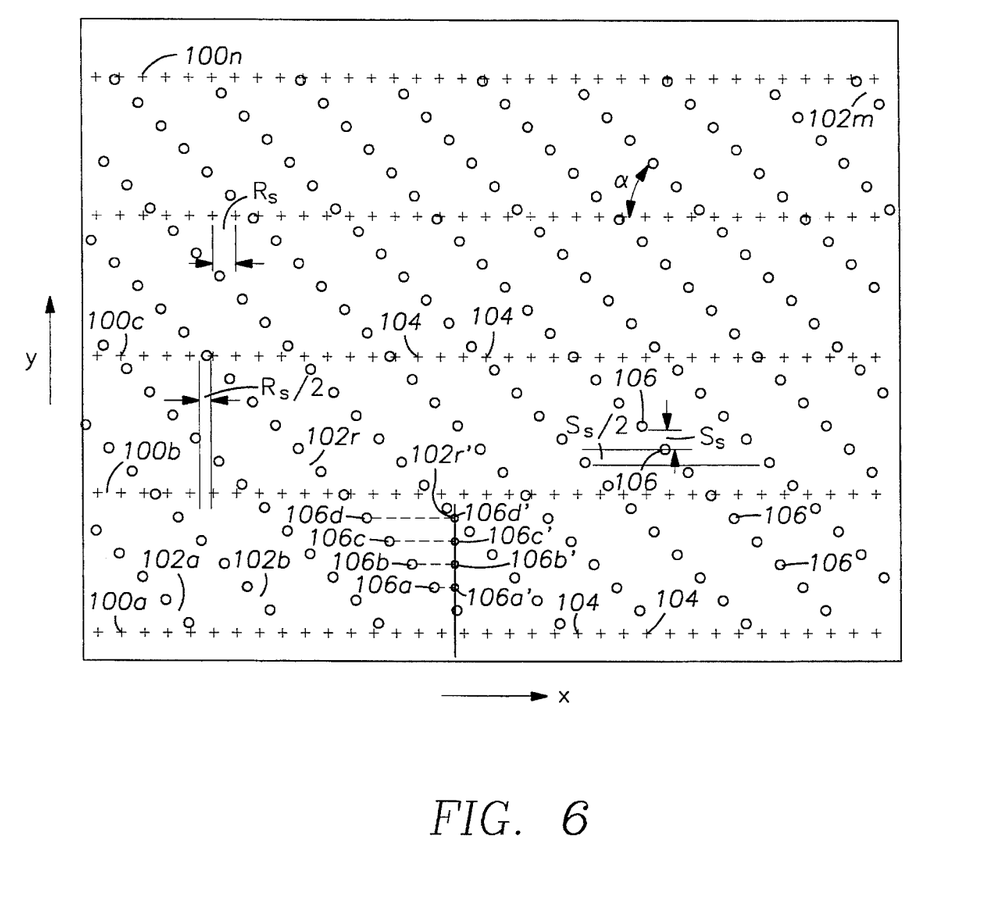
FIG. 6 shows a survey geometry in which the receivers and the source points are staggered and that the source lines are placed non-orthogonal to the receiver lines.

FIG. 6 shows an example of a survey geometry according to the present invention which provides smaller (fractional) bins and results in more uniform offset distribution compared to the conventional crossed-array 3D survey geometries, such as shown in FIG. 1.

In the survey geometry of FIG. 6, a plurality of receiver lines 100a–100n, each containing a plurality of equispaced receiver stations 104, are placed in parallel on the area to be surveyed. The spacing in adjacent receivers 104 along the receiver lines is denoted by Rs. The receivers 104 between adjacent receiver lines are staggered by a fraction 1/j of the receiver spacing Rs, where j is an integer greater than or equal to two (2). FIG. 6 shows a stagger equal to one-half the receiver spacing Rs. The source points are located along a plurality of parallel source lines 102a–102m, which are placed at a predetermined non-orthogonal angle ($\alpha$) to the receiver lines. In FIG. 6, the source lines 102a–102m are at forty five (45) degrees to the receiver lines 100a–100n. The source points 106 along each source line are equispaced along the y-axis with a source spacing Ss. The source points 106 in adjacent source lines are staggered a fraction (1/k) of the source spacing Ss, where k is an integer equal to or greater than 2. In FIG. 6, the source stagger is ½ Ss.

Conceptually, the geometry of FIG. 6 can easily be visualized from the geometry of FIG. 2. The receiver lines 100a–100n in FIG. 6 are placed in the same manner as the receiver lines 30a–30m in FIG. 2. However, each source point along a source line of FIG. 2 is shifted (to the left in the example of FIG. 6) to its associated diagonal source line while maintaining its distance from the receiver lines along the y-axis. For example, the source points 106a–106d placed on the diagonal source line 102r would be respectively placed at points 106a'–106d' on a corresponding vertical source line 102r' in the survey geometry of FIG. 2. The vertical or y-axis distance between adjacent source points along the source lines 102r and 102r' is the same. As in the case of the survey geometry of FIG. 2, the survey geometry of FIG. 6 provides j×k bins. The survey geometry shown in FIG. 6 will provide four (4) bins. Additionally, the survey geometry of FIG. 6 provides a more uniform offset distribution compared to the offset distribution which results from the survey geometry of FIG. 1.

Figure 7:
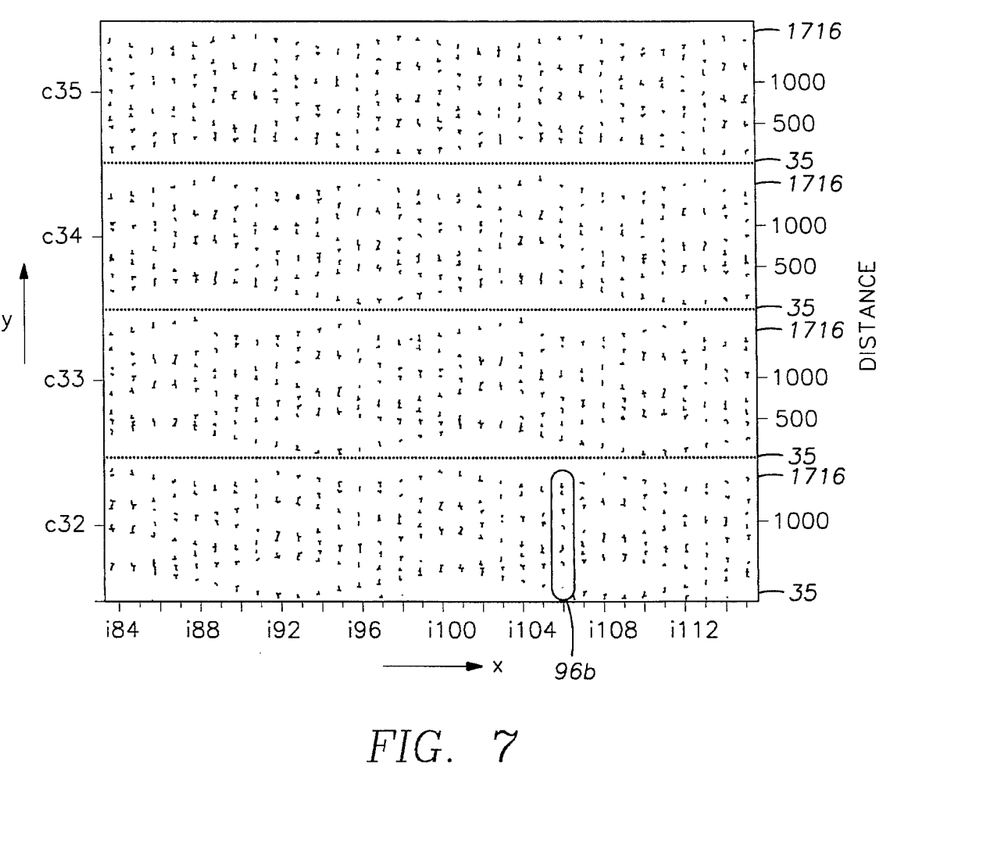
FIG. 7 shows a typical offset-distribution corresponding to the survey geometry shown in FIG. 6.

FIG. 7 shows a typical offset distribution corresponding to the survey geometry of FIG. 6. For simplicity, the in-line cells and cross-line cells have been given the same numbers as in FIG. 4. It will be seen that the offset distribution shown in FIG. 7 is more uniform compared to the offset distribution shown in FIG. 4. For example, the offsets 96c corresponding to the cell combination i106 and c32 are substantially uniformly distributed compared to the clustered distributions 96a and 96b for the same cells in FIG. 4. Overall, the offset distribution shown in FIG. 7 is substantially more uniform compared to the offset distribution of FIG. 4 and, thus, results in improved seismic prospecting results.

Thus, the present invention provides methods for performing seismic surveys which address many of the problems associated with conventional 3D crossed array survey methods. The methods of the present invention provide smaller or fractional bins compared to the bins obtained using conventional methods, flexibility of manipulating bin sizes, improved offset distribution compared to the conventional methods and allows the use of differently spaced receiver and source lines for performing seismic surveys.

The foregoing description is directed to particular methods of the invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of performing a seismic survey, comprising the steps of:

generating seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines non-perpendicularly.

wherein the positions of said source locations within succeeding source lines of a series of said source lines in positional order are staggered from said source locations within the preceding source lines by a fraction of the spacing between adjacent source locations within said source lines, said spacing measured perpendicular to said receiver lines, where said fraction is of the form 1/j, where j is an integer.

2. A method of performing a seismic survey, comprising the steps of:

generating seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines non-perpendicularly, wherein the positions of said receiver locations within succeeding receiver lines of a series of said receiver lines in positional order are staggered from said receiver locations within the preceding receiver lines by a fraction of said spacing between adjacent receiver locations within said receiver lines, said spacing measured parallel to said receiver lines, where said fraction is of the form 1/k, where k is an integer.

3. A method of performing a seismic survey, comprising the steps of:

generating seismic signals at a plurality of source locations, said source locations substantially equally spaced along a plurality of source lines, said source lines being substantially parallel to each other and substantially equally spaced from each other; and detecting said seismic signals at a plurality of receiver locations, said receiver locations substantially equally spaced along a plurality of receiver lines, said receiver lines being substantially parallel to each other and substantially equally spaced from each other, said receiver lines intersecting said source lines non-perpendicularly, wherein the positions of said source locations within succeeding source lines of a series of said source lines in positional order are staggered from said source locations within the preceding source lines by a fraction of said spacing between adjacent source locations within said source lines, said spacing between source locations measured perpendicular to said receiver lines, where said fraction is of the form $1/j$, where $j$ is an integer.

and the positions of said receiver locations within succeeding receiver lines of a series of said receiver lines in positional order are staggered from said receiver locations within the preceding receiver lines by a fraction of said spacing between adjacent receiver locations within said receiver lines, said spacing between receiver locations measured parallel to said receiver lines, where said fraction is of the form $1/k$, where $k$ is an integer.

* * * * *